June 20, 1933. A. M. YOUNG 1,915,209
HELICOPTER
Filed June 9, 1931
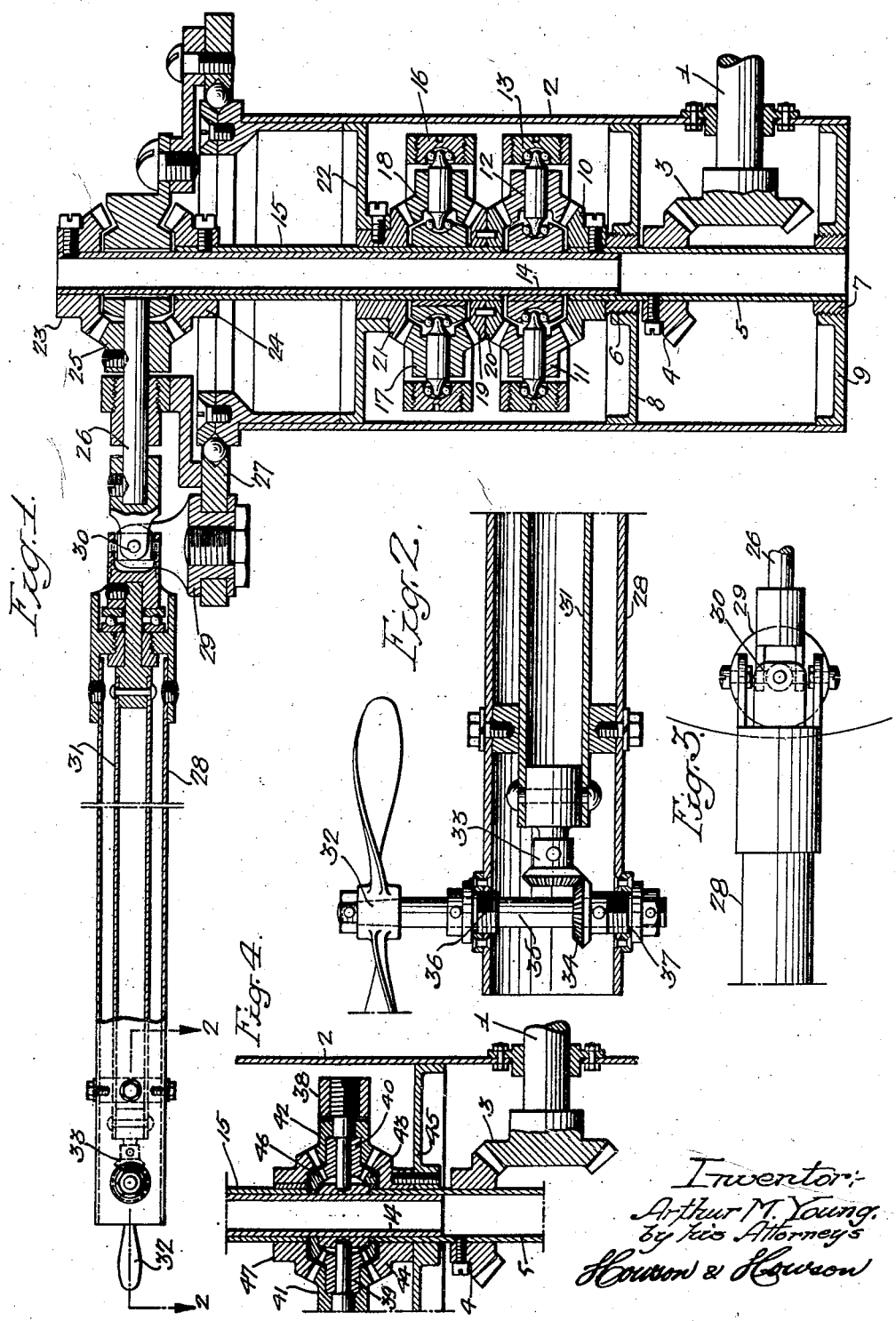
Inventor:
Arthur M. Young.
by his Attorneys
Howson & Howson Patented June 20, 1933

1,915,209

UNITED STATES PATENT OFFICE

ARTHUR M. YOUNG, OF RADNOR, PENNSYLVANIA

HELICOPTER

Application filed June 9, 1931. Serial No. 543,203.

This invention relates to improvements in helicopters and particularly to the class of helicopters which comprises one or more sustaining screw propellers of large diameter rotated by auxiliary propellers of comparatively small diameter located either at the outer end of the respective blades of the main screw propeller or at some point along such blades.

The principal object of the invention is to locate the power source or engine of the helicopter in fuselage and to provide means for conducting power from such source to a shaft in the hub of the main sustaining screw propeller and from there to the auxiliary propellers without producing any torque reaction due to rotation of the various elements on the fuselage itself.

The means by which this general object of the invention is accomplished is a gear train which, though it is capable of various modifications, comprises in every case five elements. Such elements are a driven pair of members, a driving pair of members and means operatively interposed between said pairs of members to enable the transmission of the relative motion only of the driving pair to the driven pair. One of the members of the driving pair is attached to the shaft of the engine, while the other member of this pair is attached to the frame or casing of the engine and, therefore, to the fuselage of the device itself. One of the members of the driven pair may be attached to the shaft or shafts of the auxiliary propellers and the other member to the frame of the main or sustaining propeller. In the embodiments disclosed herein for the purpose of illustration, the members of the driven pair, while not attached directly to the auxiliary propeller shaft and the frame of the sustaining propeller, are arranged so that their rotation with respect to one another causes rotation of the auxiliary propellers with respect to the sustaining propeller.

The means constituting the fifth element of the gear train is not attached either to the driving or to the driven pair of members but interrelates the two pairs in such manner as to cause the following desired relation to exist between the various elements of the train:

(1) The driven pair of members as a unit can rotate with respect to the driving pair as a unit.

(2) The gear train will transmit any relative motion existing between the members of the driving pair to the driven pair so that the members of the driven pair rotate with respect to each other to the same extent that the members of the driving pair rotate with respect to each other.

(3) Motion between the driving pair of members as a unit and the driven pair as a unit will not effect the relative motion between the members of the driving pair and its transmission into relative motion between the members of the driven pair.

In addition to the above set forth relation which must exist between the elements of the gear train to fulfill the requirements of the invention, I have found in experimenting with the gear train that it is of utmost importance that torque between the members of one pair should not result in friction opposing motion between the pairs of members as units. This is taken care of by ball or roller bearings which in the embodiments disclosed herein may be located on pinions in differential spiders.

For the purpose of illustration only, I have disclosed two embodiments of the invention which may be more clearly understood by reference to the drawing and the following detailed description taken in connection therewith.

In the drawing:

Fig. 1 is a sectional view taken through one of the radially extending arms of the sustaining propeller and illustrating clearly the specially designed gear train which constitutes the main feature of the invention;

Fig. 2 is an enlarged sectional view taken along line 2—2 of Fig. 1 and showing in detail the end portion of one of the arms of the sustaining propeller;

Fig. 3 is a plan view showing clearly the universal joint interposed between the hub of the sustaining propeller and its arm; and Fig. 4 is a partial section of a modified form of the invention.

Referring to the drawing and particularly to Fig. 1, 1 designates the shaft of an engine (not shown) which is located in the fuselage of the helicopter and comprises the source of power for operating the device. Shaft 1 extends through and is journaled in the wall of casing 2 which encloses the various gears of the gear train and is attached rigidly to the fuselage of the helicopter and to the frame of the engine. A miter gear 3 is carried by shaft 1 at the end thereof and meshes with a second miter gear 4 which is carried by a rotatable hollow shaft 5. This shaft is suitably journaled in bearings 6 and 7 which are mounted respectively upon disk 8 and end wall 9, the said disk and end wall being rigidly attached to the casing. A bevel gear 10 is carried by shaft 5 at the upper end thereof and meshes with a pair of pinions 11 and 12 which are carried by a rotatable framework or spider 13. The pinions are preferably mounted for rotation with respect to the spider by means of ball bearings as clearly illustrated. The use of ball bearings in this instance is very important since it enhances greatly the operation of the device. Spider 13 is rigidly attached to the lower end of a hollow shaft 14, which shaft is mounted for rotation within a second hollow shaft 15. A second spider 16, which is in all respects similar to spider 13, is rigidly attached to the lower end of shaft 15 and adapted for rotation therewith. Spider 16 also carries pinions 17 and 18 which are similar to pinions 11 and 12 and similarly carried by their spider. Interposed between the two spiders are a pair of bevel gears 19 and 20 which are placed back to back and rigidly attached to each other. These gears mesh respectively with the pinions of spider 16 and spider 13 as illustrated. A bevel gear 21 which meshes with pinions 17 and 18 is rigidly attached to disk 22 which in turn is fastened to casing 2.

The inner hollow shaft 14 carries at its upper end a bevel gear 23, while the outer shaft 15 carries at its upper end a similar gear 24. These gears mesh with pinions 25 which are carried at the inner ends respectively of the rotatable shafts 26. It will be understood that the sustaining propeller may comprise any desired number of radially extending arms. However, I prefer to use three of such arms as is usual in helicopters and, for this reason, only one of the shafts 26 and the pinions carried thereby is visible in the view of Fig. 1.

The sustaining propeller comprises the aforementioned arms carrying the blades and a suitable hub 27, which in the present instance is rotatably carried by casing 2 by means of a suitable ball bearing. Since it is important that no torque reaction be imparted to casing 2 by the rotation of the sustaining propeller, it is essential that a ball bearing or similar anti-friction device be utilized to mount the hub upon the casing. The radial arms of the sustaining propeller in the present instance each comprises a hollow arm 28 which is carried by the hub of the propeller by means of a suitable supporting lug 29. While the blade which is carried by the arm 28 is not shown in the drawing, it having been omitted for clarity of illustration of the invention, it will be understood that such blade may be carried by the arm in any suitable manner.

Rotatable shaft 26 is mechanically connected through a universal joint 30 to hollow shaft 31, which is rotatably mounted within arm 28. The purpose of the universal joint and the specific construction of lug 29 is to allow the hollow arm of the sustaining propeller and the hollow shaft extending therethrough to take any angle with respect to the plane of rotation of the propeller. This forms no part of the present invention and will not, therefore, be described in detail herein. It is, however, illustrated on the drawing in Figs. 1 and 3.

Hollow shafts 31 function to conduct power to the auxiliary propellers 32 which are rotatably carried at the outer ends of the sustaining propeller arms. Referring to Fig. 2, which discloses the details of such mounting, a miter gear 33 is carried at the outer end of each of the shafts 31 and this gear meshes with a second miter gear 34 mounted upon shaft 35 of the auxiliary propeller. Shaft 35 is suitably journaled in arm 28 by means of bearings 36 and 37.

Considering the operation of the helicopter and the manner in which the present invention accomplishes its desired purpose, it will be understood that the engine drives the auxiliary propellers through the various gears and rotatable shafts. Rotation of the auxiliary propellers sets up forces which drive the main propeller about casing 2. As previously set forth, it is the desired purpose of the present invention to have the auxiliary propellers and the sustaining propeller driven thereby entirely independent mechanically, and to prevent torque reaction on the fuselage of the device which might be caused by the rotation of the propellers.

Considering the specific embodiment disclosed in Fig. 1, power in the form of torque between the engine and its stationary frame will be transferred to torque between gear 10 and gear 21. The relative motion between these gears is transferred to spiders 13 and 16, which in turn transfer it to gears 23 and 24. These gears again transfer such relative motion to hollow shafts 31 with respect to arms 28. In other words, this same relative motion is transmitted to the auxiliary propellers with respect to the main or sustaining propeller. The sustaining propeller rotates, as stated before, about casing 2. At the same time, spiders 13 and 16 can at all times rotate without affecting the motion transmitted from the engine to shafts 31.

In explanation of the manner in which the gear train functions and particularly the operation of the rotatable spiders and their gears, it will be noted that if the two spiders rotate together, the bevel gears 10 and 21 remaining at rest, the inner double gear comprising gears 19 and 20 will rotate at twice the speed of the spiders, the rotation of the double gear allowing rotation of the spiders. The double gear will not, however, allow rotation of gear 21 with respect to gear 10 without corresponding rotation of spider 16 with respect to spider 13. In other words, the relative rotation between the engine shaft and its frame is imparted to the spiders and the differential rotation of the spiders is transmitted to the auxiliary propellers through the medium of gears 23 and 24 and their associated pinions. The two essential motions of the device, viz., rotation of shafts 31 with respect to arms 28 and rotation of hub 27 with respect to casing 2 are thus seen to be entirely independent of each other. Moreover, and conversely, torque caused by either of these motions will not give rise to torque in the fuselage of the device.

In Fig. 4, there is illustrated by means of a partial sectional view a modified form of the device which comprises a single spider instead of a plurality of spiders. In this modification, a single spider 38 carries inner and outer sets of rotatable pinions 39, 40 and 41, 42, respectively. Shaft 5 carries at its upper end a bevel gear 43 which meshes with pinions 39, 40 of the spider. Bevel gear 44, which is rigidly fixed with respect to casing 2 since it is carried by stationary disk 45, meshes with pinions 41, 42. Shaft 14 extends through the hub of spider and carries bevel gear 46 which also meshes with pinions 39, 40. Shaft 15 carries bevel gear 47 at its lower end which meshes with pinions 41, 42. It will be understood that while ball or roller bearings have not been shown in this modified form of spider arrangement, in order to permit clarity illustration of the general construction in the available space, it is essential that ball or roller bearings be used to reduce friction. The inner and outer sets of pinions are, of course, relatively rotatable with respect to each other and with respect to the spider.

In operation, the modified form of device follows the same general principle of operation as does the device of Fig. 1. Power in the form of torque between the engine and casing 2 is transferred to torque between gears 43 and 44. The relative motion between these gears is transferred to the spider and its inner and outer sets of pinions which, in turn, transfer it to gears 23 and 24 via shafts 14 and 15. Any rotation of gear 44 with respect to gear 43 will be imparted to the spider. Thus the two essential motions previously mentioned are maintained independent of each other, and torque is not imparted to the fuselage. It will thus be seen that the relative motion between the engine shaft and its stationary frame is preserved and transmitted to the auxiliary propellers with respect to the sustaining propeller, as in the case of the previously discussed embodiment.

While I have disclosed herein only two embodiments illustrating the invention and the general principles thereof, it will be readily apparent to persons skilled in the art that various modifications in the construction of the device are possible without departing from the spirit and scope of the invention. As previously stated, the gear train which constitutes the essential feature of the invention may take various forms so long as the five essential elements thereof are provided and operate in accordance with the principles outlined herein. It is to be understood, therefore, that only such limitations as are imposed upon the invention by the accompanying claims are to limit the scope thereof.

I claim:

1. In a helicopter, a sustaining screw propeller, auxiliary propellers carried by said propeller for rotating the same, a source of power located in the fuselage of said helicopter, means for transmitting power from said source to said auxiliary propellers, and means operatively associated with said transmitting means for preventing torque reaction on said fuselage.

2. In a helicopter, a sustaining screw propeller, auxiliary propellers carried by said propeller for rotating the same, a source of power located in the fuselage of said helicopter, means for transmitting power from said source to said auxiliary propellers, and means operatively associated with said transmitting means for preventing torque reaction on said fuselage, said last means comprising at least one rotating framework carrying rotating pinions.

3. In a helicopter, a sustaining screw propeller, auxiliary propellers carried by said propeller for rotating the same, a source of power located in the fuselage of said helicopter, means for transmitting power from said source to said auxiliary propellers, and means operatively associated with said transmitting means for preventing torque reaction on said fuselage, said last means comprising at least one rotating framework carrying rotating pinions supported on antifriction devices.

4. In a helicopter, a sustaining screw propeller, auxiliary propellers carried by said propeller for rotating the same, a source of power including a rotating element located in the fuselage of said helicopter, means for transmitting power from said source to said auxiliary propellers, and means operatively associated with transmitting means for causing transmission of only the relative motion of the rotating element of said source with respect to said fuselage.

5. In a helicopter, a sustaining screw propeller, auxiliary propellers carried by said propeller for rotating the same, a source of power including a rotating element located in the fuselage of said helicopter, means for transmitting power from said source to said auxiliary propellers, and means operatively associated with said transmitting means for causing transmission of the relative motion of the rotating element of said source with respect to said fuselage without producing any torque reaction between the sustaining propeller and the fuselage.

6. In a helicopter, a sustaining screw propeller, auxiliary propellers carried by said propeller for rotating the same, a source of power including a rotating element located in the fuselage of said helicopter, means for transmitting power from said source to said auxiliary propellers, and means operatively associated with said transmitting means for maintaining the relative motion of said auxiliary propellers with respect to said sustaining propeller equal to the relative motion of the rotating element of said source with respect to said fuselage.

7. In a helicopter, a sustaining screw propeller, auxiliary propellers carried by said propeller for rotating the same, a source of power located in the fuselage of said helicopter, means for transmitting power from said source to said auxiliary propellers, and means operatively associated with said transmitting means for maintaining the motion of said sustaining propeller solely aerodynamically dependent upon the motion of said auxiliary propellers.

8. In a helicopter, a sustaining screw propeller, auxiliary propellers carried by said propeller for rotating the same, a source of power located in the fuselage of said helicopter, means for transmitting power from said source to said auxiliary propellers, and means operatively associated with said transmitting means for preventing torque reaction on said fuselage, said last means comprising at least one rotating member carrying a rotating gear.

9. In a helicopter, a sustaining screw propeller, auxiliary propellers carried by said propeller for rotating the same, a source of power located in the fuselage of said helicopter, means for transmitting power from said source to said auxiliary propellers, and means operatively associated with said transmitting means for preventing torque reaction on said fuselage, said last means comprising a gear driven by said source, a gear fixedly mounted with respect to said fuselage, a pair of relatively movable members, and at least one rotating member drivably connected to said members and carrying rotating gears meshing with the aforesaid gears.

ARTHUR M. YOUNG.